(12) United States Patent
Godi et al.

(10) Patent No.: US 7,030,198 B2
(45) Date of Patent: Apr. 18, 2006

(54) CURABLE COMPOSITIONS COMPRISING AN EPOXIDISED UNSATURATED POLYESTER AND MINERAL FILLERS

(75) Inventors: Alessandro Godi, Verona (IT); Pierpaolo Tassone, Verona (IT)

(73) Assignee: Quarella S.p.A., Verona (IT)

( * ) Notice: Subject to any disclaimer, the term of this patent is extended or adjusted under 35 U.S.C. 154(b) by 60 days.

(21) Appl. No.: 10/433,690

(22) PCT Filed: Nov. 22, 2001

(86) PCT No.: PCT/EP01/13546

§ 371 (c)(1),
(2), (4) Date: Jun. 5, 2003

(87) PCT Pub. No.: WO02/46255

PCT Pub. Date: Jun. 13, 2002

(65) Prior Publication Data

US 2004/0039136 A1    Feb. 26, 2004

(30) Foreign Application Priority Data

Dec. 6, 2000   (IT) .......................... MI2000A2656

(51) Int. Cl.
  C08F 283/01  (2006.01)
  C08F 63/02   (2006.01)
  C08F 59/14   (2006.01)
  C08F 63/10   (2006.01)
  C08F 63/04   (2006.01)

(52) U.S. Cl. .................. 525/529; 525/523; 525/539; 525/445

(58) Field of Classification Search .............. 524/425, 524/523; 525/529, 523, 539, 445; 529/539
See application file for complete search history.

(56) References Cited

U.S. PATENT DOCUMENTS

| | | | | |
|---|---|---|---|---|
| 3,516,955 A | | 6/1970 | Taft | 260/22 |
| 3,760,032 A | * | 9/1973 | Ford, Jr. | 525/41 |
| 4,024,111 A | * | 5/1977 | Thomas et al. | 525/444 |
| 4,239,808 A | * | 12/1980 | Arnason | 428/482 |
| 4,316,835 A | * | 2/1982 | Gardner | 523/512 |
| 5,350,814 A | * | 9/1994 | McGarry et al. | 525/531 |
| 5,552,478 A | * | 9/1996 | Fisher | 525/41 |
| 6,268,464 B1 | * | 7/2001 | Keinanen et al. | 528/272 |
| 6,284,845 B1 | * | 9/2001 | Panandiker et al. | 525/438 |

FOREIGN PATENT DOCUMENTS

| | | |
|---|---|---|
| DE | 1 074 260 | 1/1960 |
| DE | 1 240 282 | 5/1967 |
| EP | 0 058 740 | 9/1982 |
| EP | 057 740 A1 * | 9/1982 |
| EP | 0 106 655 | 4/1984 |
| EP | 0 798 321 | 10/1997 |
| EP | 798 321 A2 * | 10/1997 |
| GB | 1000502 | 8/1965 |
| GB | 1 264 091 | 2/1972 |
| JP | 6-9257 * | 1/1994 |
| JP | 7-33839 A * | 2/1995 |
| JP | 8-301948 * | 11/1996 |

OTHER PUBLICATIONS

JP 8-301948 (Abstract/English translation).*
JP 6-9257 (Abstract/English translation).*
JP 7-33839 (abstract and translation in English).*

* cited by examiner

*Primary Examiner*—Fred Teskin
*Assistant Examiner*—Rip A. Lee
(74) *Attorney, Agent, or Firm*—Young & Thompson

(57) ABSTRACT

A curable composition includes an unsaturated polyester and an unsaturated monomer copolymerisable with the unsaturated polyester in the presence of polymerisation accelerators and initiators. The unsaturated polyester is an epoxidised unsaturated polyester obtainable by reaction between unsaturated polyester obtainable by reaction between the carboxy end groups of a polyester having unsaturated monomer units and the epoxy groups of an epoxy resin.

9 Claims, No Drawings

CURABLE COMPOSITIONS COMPRISING AN EPOXIDISED UNSATURATED POLYESTER AND MINERAL FILLERS

The present invention relates to curable compositions consisting of an epoxidised unsaturated polyester, and their use to prepare agglomerated stones.

The manufacture of agglomerated stone products in which chippings of marble, granite, quartz or stone in general, of suitable particle size, are mixed with a chemically or thermally curable binder until reaching a sufficient consistency to make the finished product suitable for numerous uses in the construction industry has long been known. Agglomerates are manufactured industrially by means of various compacting technologies, the main ones being vibration and vibro-compressure, which can be performed either at atmospheric pressure or under vacuum.

These materials can be made in the form of tiles, slabs with an area of over 4 square metres, or blocks with a volume of approximately 3 cubic metres which are subsequently cut into slabs. The choice of geometry of the semi-manufactured product depends on the Mohs hardness of the starting raw materials, the required appearance of the finished product and the required output of the manufacturing plant.

The development of moulding technology has considerably improved the technical and aesthetic properties of the products, because highly effective compacting means can be used to mould the finished product with a drastic reduction in binder.

An unsaturated polyester resin is generally used as binder for technical reasons of processability and financial reasons associated with its relatively low cost, and is sometimes modified by adding special additives with specific functions.

The resulting products possess some very interesting technical and aesthetic characteristics, deriving from the quality of the raw materials used as mineral fillers and from the fact that the binder, namely unsaturated polyester resin, irreversibly cures under the effect of temperature and/or special reaction initiators.

One of the few but significant drawbacks of using polyester resins as binders is their limited resistance to attack by alkaline substances, namely chemicals with a pH higher than 7, under certain conditions of use, and this obviously affects the chemical resistance of products made from unsaturated polyester resins used as raw material.

The reason is that the synthesis of an unsaturated polyester resin, as will be described in greater detail below, can be generically represented by the reaction product between a higher alcohol (such as propylene glycol) and a bifunctional organic acid or an anhydride (such as maleic or phthalic anhydride), as shown below catalysed by alkaline substances in the presence of water, and leads to the destruction of the polymer and a return to the starting raw materials.

This behaviour by the unsaturated polyester resin means that the products made with this raw material have poor chemical resistance, especially to alkaline attack.

"Resistance to chemical attack" herein means the characteristic that defines the behaviour of the surface of a covering material in contact with chemically aggressive agents, ie. those which, in view of their chemical composition and characteristics, are potentially able to react with the surface and corrode it, penetrating into it permanently or otherwise altering its appearance and its physical and mechanical characteristics.

Aggressive chemicals, of acid or basic nature, may be spilt on the floor in an industrial environment, as in the case of oil and grease in a mechanical workshop or chemical reagents in an analysis laboratory, or may constitute liquids which for some reason come into contact with a floor or wall covering in a private dwelling, such as foodstuffs, ink, etc.; they may also be components of cleaning and sanitising products normally used for routine or non-routine maintenance of premises.

Finally, it should be borne in mind that most adhesives used to lay wall and floor coverings may give rise to alkaline reactions. In particular, the adhesive traditionally used, ie. cement grout, hardens as a result of the reaction between water and cement powder, developing a basic environment (pH between 10 and 12). Under certain conditions of use, such as laying with an excessive amount of reaction water or the use of poor quality cement powder, the alkaline reaction that develops during hardening may attack the agglomerate used as covering, causing damage which rises from the laying surface to the visible surface, with efflorescence and discolouring of the surface.

In extreme cases, the damage caused to the structure of the agglomerated material as a result of the alkaline reaction may lead to breakage and detachment of the covering material from the base.

The present invention relates to epoxidised unsaturated polyester resin compositions which can be used to make agglomerated stones or systems constituted by mineral filers and resins in general, with improved characteristics of chemical resistance, especially to alkaline attack.

The composition of the invention comprise an epoxidised unsaturated polyester as defined below, and an unsaturated monomer copolymerisable with said polyester. The invention also relates to a process for the preparation of agglomerated stones by using the compositions of the invention, and to the agglomerated stones thus obtained.

A further aspect of the invention relates to the new epoxidised unsaturated polyesters or epoxypolyesters.

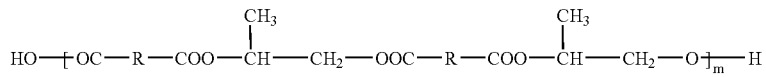

wherein R is, for example, the aryl residue of phthalic anhydride or the —CH═CH— residue of maleic anhydride, and m is a value dependent on the required molecular weight of the polymer.

The polymer thus formed is subsequently mixed with a monomer (such as styrene) to give a product with the required Theological characteristics.

The reverse reaction to the esterification described above, called saponification (or more generically hydrolysis), is The epoxypolyesters of the invention are products of condensation of a mixture of polycarboxylic acids, especially dicarboxylic acids, and polyhydroxylic alcohols, in which one of the components is unsaturated, which are subsequently epoxidised with epoxy resins.

The unsaturated dicarboxylic acids or their anhydrides are those normally used in the production of unsaturated polyesters, such as fumaric acid, maleic acid, itaconic acid, citraconic acid and maleic anhydride. Unsaturated dicarboxylic acids may be partly substituted by saturated or aromatic dicarboxylic acids such as isophthalic acid, phthalic acid, tetrahydrophthalic acid, hexahydrophthalic acid, trimellitic acid, adipic acid, succinic acid or azelaic acid or their anhydrides.

The ratio between unsaturated dicarboxylic acids or their anhydrides and saturated or aromatic dicarboxylic acids or their anhydrides is generally between 0.5 and 1.2.

The glycols used to prepare the polyesters of the invention include ethylene glycol, propylene glycol, diethylene glycol, dipropylene glycol, propoxylated bisphenol, ethoxylated bisphenol, trimethylolpropane, trimethylolpropane monoallyl ether, trimethylolpropane diallyl ether or mixtures thereof, such as a mixture of dipropylene glycol, propylene glycol and ethylene glycol in molar ratios of between 1:1:0.5 and 1.25:1:0.25.

The epoxy resins used to epoxidise the unsaturated polyesters by means of the reaction between the carboxyl groups of the polyester and the epoxy groups, are those derived from the reaction bisphenol A—epichlorohydrin, defined by the following general formula:

$$CH_2-CHCH_2-\underset{O}{[}O-R'-OCH_2CHCH_2\underset{OH}{]_n}-O-R'-OCH_2CH-CH_2$$

wherein R' is the bisphenyl residue of bisphenol A (according to the chemical formula shown below), and n has a value between 0 and 10.

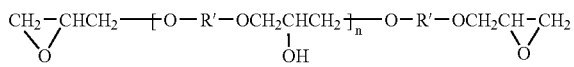

If the —CHCH$_3$—CH$_2$— group of the glycol is represented by R", the epoxidised unsaturated polyester resin has the following chemical formula:

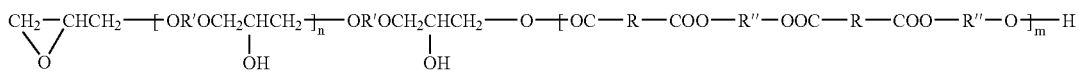

The value n of the epoxy resin used in the epoxidisation is preferably between 0 and 3, corresponding to a molecular weight of between 360 and 900.

Epoxidised Novolac resins deriving from the reaction between Novolac and epichlorohydrin can also be used.

Good results in terms of chemical resistance to hydrolysis have also been obtained by adding epoxy adducts, such as glycidyl ester or glycidyl ether, or aliphatic or cycloaliphatic epoxy resins, such as butanediol, vinyl cyclohexene, dicyclopentadiene diepoxides and monoepoxides such as p-tert-butylphenyl epoxide to the unsaturated polyester.

The epoxy resins preferably used in the invention are those deriving from bisphenol A.

Epoxidised polyester solutions in vinyl or acrylic monomers, mixed with mineral and other fillers, cure under the effect of peroxides, and generally in combination with curing accelerators. Agglomerates with good mechanical strength and high resistance to the action of chemical agents, especially the hydrolytic action of strong alkalis, are obtained, as demonstrated by the examples reported below, with much higher resistance values than those obtainable with ordinary polyester resins.

The polyesters of the invention can be prepared by reacting glycols with saturated or unsaturated dicarboxylic acids in molar ratios of 1 to 1.2, at a polycondensation temperature of between 180 and 200° C., up to a number of 0.35–0.45 free carboxyl groups per 1000 parts by weight of resin. At a second stage, under the action of suitable catalysts (such as alkyl ammonium salts and alkyl phosphonium salts) a number of carboxyl groups is reacted with a number of epoxy groups at temperatures of between 150 and 200° C. (preferably between 170 and 190° C.) so as to obtain a resin containing between 0.06 and 0.13 free carboxyl groups per 1000 parts by weight, equal to an acid number of between 3 and 7.

The amount of bisphenol A-based epoxy resin is 5–14% by weight of the epoxidised polyester. The percentages by weight of bisphenol A which are present in the epoxidised polyester resin before dilution in unsaturated monomers are between 3 and 9%. These percentages fall to 2–5.8% in the resin diluted with 35% styrene.

The numeric mean molecular weight $M_n$ and weighted mean molecular weight $M_w$ are calculated on the basis of the following equations:

$$\overline{M}_n = \frac{\sum n_{e,i} \cdot M_{e,i} + \sum n_{g,i} \cdot M_{g,i} + \sum n_{a,i} \cdot M_{a,i} - 18 \cdot P \cdot \sum n_{a,i}}{\sum n_{e,i} + \sum n_{g,i} + \sum n_{a,i} - 2P \cdot \sum n_{a,i}}$$

$$\overline{M}_w = \overline{M}_n \cdot (1+P)$$

wherein $n_{e,i}$, $n_{g,i}$ and $n_{a,i}$ are the numbers of moles of the epoxy resins, glycols and acids respectively, $M_{e,i}$, $M_{g,i}$ and $M_{a,i}$ are the molecular weights of the epoxy resins, glycols and acids respectively, and P is the degree of esterification. The degree of esterification is calculated on the basis of the following equation:

$$P = \frac{\text{Initial acid number} - \text{Final acid number}}{\text{Initial acid number}}$$

The weighted mean molecular weights $M_w$ are obtained by GPC (Gel Permeation Chromatography) analysis, characterised as follows:

| Detector | UV 254 nm |
|---|---|
| Flow rate | 1 ml/min. |
| Solvent | tetrahydrofuran |
| Columns | 1st column 5 µm Hypergel OP10 |
| | 2nd column 5 µm Hypergel OP25 |

The values obtained for the epoxidised polyester are approximately twice as large as those obtainable with non-epoxidised polyester resins. Unexpectedly, the viscosity of the epoxidised polyester diluted in styrene is almost equal to the viscosity of the non-epoxidised polyester at the same dilution.

The epoxidised polyesters of the invention can be cured at room temperature or at relatively high temperatures like ordinary non-epoxidised polyesters, using peroxides or hydroperoxides such as methyl ethyl ketone peroxide, cyclohexanone peroxide and benzoyl peroxide in amounts ranging between 0.5 and 4 parts per 100 parts by weight of the sum of the epoxidised polyester and the diluting monomer or monomers. The amount of diluting monomers is between 0.25 and 0.7 parts per part by weight of the epoxidised polyester, and preferably between 0.30 and 0.40.

The dilution monomer is preferably styrene or another unsaturated monomer able to react with ordinary unsaturated polyesters such as vinyl toluene, α-methyl styrene, methyl methacrylate and vinyl cyclohexene.

Examples of suitable curing accelerators are metal salts such as cobalt, vanadium and vanadyl salts, and others commonly used to cure unsaturated polyesters. Metal accelerators are used at the rate of 0.1–1 parts (as metal) per 100 parts by weight of the epoxidised polyester dissolved in the monomer.

Unsaturated polyesters in styrene based on polyglycols, phthalic anhydride and maleic anhydride have unsatisfactory resistance to alkalis. Even if phthalic anhydride is replaced with isophthalic acid and maleic anhydride with fumaric acid, there is no satisfactory improvement. Polyesters based on propoxylated bisphenol and fumaric acid have good resistance to alkalis but are not cheap, and have high viscosities and curing times unsuitable for agglomerate manufacture.

Epoxidised polyesters dissolved in styrene and suitably cured have high mechanical characteristics and, surprisingly, much greater resistance to strong alkalis than non-epoxidised polyesters.

The same results relating to alkali resistance are obtained for all curable mixtures consisting of epoxidised polyester resin and mineral fillers used as raw materials.

In particular, excellent chemical resistance results can be obtained with agglomerates made using epoxidised polyester as binder, without prejudicing any of the physico-mechanical characteristics of the finished product.

Stone agglomerates can be prepared from mineral fillers of carbonate origin (such as marble, limestone or stone in general) or siliceous origin (such as granite or quartz) mixed with epoxidised polyester in percentages of between 4 and 12% by weight.

Any functional additives which may be required for the process or those able to give the finished product particular properties (such as UV stabilisers, adhesion promoters, etc.) are as compatible with the epoxidised polyester resin as with the conventional unsaturated polyester resin.

The processes of mixing and subsequent curing of the mixtures are the same as used with conventional unsaturated polyester resins, as is the moulding process, which can be performed by pressing, vibration or vibro-compressure, either at atmospheric pressure or under vacuum.

The following examples illustrate the invention in greater detail.

EXAMPLE 1

787 parts by weight (5.864 moles) of dipropylene glycol, 341 parts by weight (3.21 moles) of diethylene glycol and 447 parts by weight (5.866 moles) of polypropylene glycol are loaded into the reactor. 978 parts by weight (6.599 moles) of phthalic anhydride and 687 parts by weight (7.01 moles) of maleic anhydride are added under stirring. The mass is gradually heated in an inert atmosphere to esterification temperature, in the range 160–210° C. The temperature increase is regulated so as to keep the temperature at the head of the column between 100 and 102° C., to prevent losses of glycol. When the degree of esterification is 84–86%, at which 205–210 parts of reaction water develop, the reaction is carried out at 190–200° C., applying a pressure of 10–20 mmHg (vacuum of 740–750 mmHg), until a 94.5–95.5% degree of esterification is reached, corresponding to:

| | |
|---|---|
| acid number | 22–25 |
| amount of reaction H$_2$O (theoretical) | 231–234 parts |
| number of free carboxyl groups (mmols/g of resin) | 0.39–0.45 |

When these values have been reached, the pressure of the apparatus is brought to atmospheric pressure, and the mass cooled to 170–190° C. At this temperature the catalyst, alkyl ammonium salt (0.03% of the reagent mass), and 180 parts of epoxy resin (molecular weight 380, in the general formula n=0.13), equal to 0.9473 epoxide groups, are loaded.

The reaction is carried out until 0.14–1.18 free carboxyl groups are obtained, corresponding to an acid number of 8–10.

After the addition of inhibitors (toluene hydroquinone or hydroquinone, 100 ppm) the mixture is dissolved in a sufficient amount of styrene to obtain a 35% styrene content. The epoxidised resin dissolved in styrene thus obtained undergoes the characterisation shown in the table.

EXAMPLE 1

| CHEMICO-PHYSICAL CHARACTERISTICS | |
|---|---|
| Numeric mean molecular weight $\overline{M}_n$ [1] | 3100 |
| Weighted mean molecular weight $\overline{M}_w$ [1] | 6200 |
| Numeric mean molecular weight $\overline{M}_n$ (experimental) | 2698 |
| Weighted mean molecular weight $\overline{M}_w$ (experimental) | 12533 |
| Final acid number | 6 |
| % styrene | 34 |
| Viscosity at 25° C., mPa · s | 580 |
| CHARACTERISTICS OF CURED RESIN[2] | |
| Flexural strength (ASTM 790/92), Mpa | 94 ± 6 |
| Modulus of elasticity, Mpa | 2900–3100 |

[1] Values calculated on the basis of the formulas reported above.
[2] Curing conditions: 100 parts resin, 0.2 parts 6% cobalt octoate and 2 parts methyl ethyl ketone peroxide. Post-curing: 24 hrs at room temperature, 2 hrs at 80° C. and 1 hr at 90° C.

EXAMPLE 2

The procedure as described in Example 1 was repeated, but with a glycol/anhydride molar ratio of 1.04.

EXAMPLE 2

| CHEMICO-PHYSICAL CHARACTERISTICS | |
|---|---|
| Numeric mean molecular weight $\overline{M}_n$ [1] | 2800 |
| Weighted mean molecular weight $\overline{M}_w$ [1] | 5600 |
| Numeric mean molecular weight $\overline{M}_n$ (experimental) | 2192 |
| Weighted mean molecular weight $\overline{M}_w$ (experimental) | 8951 |
| Final acid number | 8 |
| % styrene | 36 |
| Viscosity at 25° C., mPa · s | 600 |

EXAMPLE 2-continued

CHARACTERISTICS OF CURED RESIN[(2)]

| | |
|---|---|
| Flexural strength (ASTM 790/92), MPa | 90 ± 5 |
| Modulus of elasticity, Mpa | 2900–3200 |

[(1)] Values calculated on the basis of the formulas reported above.
[(2)] Curing conditions: 100 parts resin, 0.2 parts 6% cobalt octoate and 2 parts methyl ethyl ketone peroxide. Post-curing: 24 hrs at room temperature, 2 hrs at 80° C. and 1 hr at 90° C.

EXAMPLE 3

The procedure as described in Example 1 was repeated, but using a glycol-anhydride molar ratio of 1.04 and a molar ratio between dicarboxylic acids or their saturated or unsaturated anhydrides of 0.69. When the required acid number had been reached, 160 parts by weight of epoxy resin were added.

EXAMPLE 3

CHEMICO-PHYSICAL CHARACTERISTICS

| | |
|---|---|
| Numeric mean molecular weight $\overline{M}_n$ [(1)] | 2900 |
| Weighted mean molecular weight $\overline{M}_w$ [(1)] | 5700 |
| Numeric mean molecular weight $\overline{M}_n$ (experimental) | 2373 |
| Weighted mean molecular weight $\overline{M}_w$ (experimental) | 11400 |
| Final acid number | 8 |
| % styrene | 36 |
| Viscosity at 25° C., mPa · s | 520 |

CHARACTERISTICS OF CURED RESIN[(2)]

| | |
|---|---|
| Flexural strength (ASTM 790/92), Mpa | 92 ± 2 |
| Modulus of elasticity, Mpa | 2900–3100 |

[(1)] Values calculated on the basis of the formulas reported above.
[(2)] Curing conditions: 100 parts resin, 0.2 parts 6% cobalt octoate and 2 parts methyl ethyl ketone peroxide. Post-curing: 24 hrs at room temperature, 2 hrs at 80° C. and 1 hr at 90° C.

EXAMPLE 4

The procedure as described in Example 1 was repeated, but using a glycol-anhydride molar ratio of 1.04 and a molar ratio between dicarboxylic acids or their saturated or unsaturated anhydrides of 0.50. When the required acid number had been reached, 150 parts by weight of epoxy resin were added.

EXAMPLE 4

CHEMICO-PHYSICAL CHARACTERISTICS

| | |
|---|---|
| Numeric mean molecular weight $\overline{M}_n$ (1) | 2900 |
| Weighted mean molecular weight $\overline{M}_w$ (1) | 5700 |
| Numeric mean molecular weight $\overline{M}_n$ (experimental) | 2337 |
| Weighted mean molecular weight $\overline{M}_w$ (experimental) | 10555 |
| Final acid number | 8 |
| % styrene | 35 |
| Viscosity at 25° C., mPa · s | 500 |

CHARACTERISTICS OF CURED RESIN[(2)]

| | |
|---|---|
| Flexural strength (ASTM 790/92), MPa | 84 ± 4 |
| Modulus of elasticity, MPa | 2400–2800 |

[(1)] Values calculated on the basis of the formulas reported above.
[(2)] Curing conditions: 100 parts resin, 0.2 parts 6% cobalt octoate and 2 parts methyl ethyl ketone peroxide. Post-curing: 24 hrs at room temperature, 2 hrs at 80° C. and 1 hr at 90° C.

Characteristics of Agglomerates

The epoxidised polyester resins obtained in Examples 1, 2, 3 and 4 were used to manufacture stone agglomerates prepared by compacting a mixture

| | |
|---|---|
| epoxidised polyester resin | 7.6% (by weight) |
| marble powder | 29.0% |
| marble chippings | 63.3% |
| colouring paste | 0.1% |

The mixing sequence was as follows:
marble chippings
epoxidised polyester resin+colouring paste
marble powder.
The moulding process was performed by vibro-compressure of the mixture under vacuum.
The cross-linking conditions of the resin were:
100 parts epoxidised resin
0.2 parts 6% cobalt octoate
2 parts 1:1 mixture of methyl ethyl ketone peroxide and acetyl acetone peroxide.

Curing was performed for 24 hours at room temperature, followed by 2 hour post-curing at 80° C.

The results of the alkali resistance tests (evaluated as the decline in mechanical properties) performed on agglomerates prepared in accordance with the formulation described above are reported in the table below. The values obtained with an agglomerate prepared under the same conditions with a conventional unsaturated polyester resin are shown in the first column for the sake of comparison.

| Mpa | Polyester Resin | Resin Example 1 | Resin Example 2 | Resin Example 3 | Resin Example 4 |
|---|---|---|---|---|---|
| Flexural strength | 31 ± 1 | 30 ± 1 | 31 ± 1 | 32 ± 1 | 30 ± 1 |
| Modulus of elasticity | $(30 \pm 2) \times 10^3$ | $(30 \pm 1) \times 10^3$ | $(30 \pm 1) \times 10^3$ | $(29 \pm 1) \times 10^3$ | $(28 \pm 1) \times 10^3$ |
| Flexural strength after 72 hours in 10% NaOH | 18 ± 1 | 27.0 ± 0.5 | 26.5 ± 0.5 | 27.9 ± 0.5 | 25.7 ± 0.2 |
| Flexural strength after 192 hours in 10% NaOH | 10 ± 1 | 21 ± 2 | 20 ± 1 | 21 ± 1 | 19 ± 1 |
| Flexural strength after 500 hours in 10% NaOH | 2.5 ± 0.1 | 14 ± 1 | 12 ± 1 | 13 ± 1 | 11 ± 1 |

The invention claimed is:

1. A curable composition comprising an unsaturated polyester and an unsaturated monomer copolymerisable with said unsaturated polyester in the presence of polymerization accelerators and initiators, characterised in that the unsaturated polyester is an epoxidised unsaturated polyester obtained by reaction between the carboxy end groups of a polyester comprising unsaturated monomer units and the epoxy groups of an epoxy resin,
wherein the unsaturated monomer units of the polyester are obtained by reacting a glycol with unsaturated polycarboxylic acids or their anhydrides, and
wherein the glycol is a mixture of dipropylene glycol, propylene glycol and ethylene glycol in molar ratios of between 1:1:0.5 and 1.25:1:1.25.

2. The composition as claimed in claim 1, wherein the epoxy resin is a resin obtained from bisphenol A and epichlorohydrin, epoxidised Novolac resins obtained from the condensation of phenol or alkylphenol and formaldehyde with epichlorohydrin, cycloaliphatic or aliphatic epoxy resins obtained by epoxidation with peracetic acid.

3. The composition as claimed in claim 2, wherein the epoxy resin is a resin of epichlorohydrin-bisphenol A with the formula:

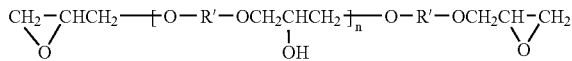

wherein R' is the bisphenyl residue of bisphenol A (according to the chemical formula shown below), and n has a value between 0 and 10.

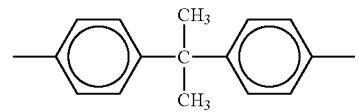

4. The composition as claimed in claim 3, wherein the epoxi-resin has a molecular weight of between 360 and 900.

5. The composition as claimed in claim 1, wherein the epoxidised unsaturated polyester has a number of free carboxyl groups between 0.06 and 0.13 per 1000 parts by weight, equal to an acid number of between 3 and 7.

6. The composition as claimed in claim 5, wherein the unsaturated monomer is selected from styrene, vinyl toluene, amethyl styrene, methyl methacrylate and vinyl cyclohexene.

7. The composition as claimed in claim 6, wherein the monomer is styrene.

8. The composition as claimed in claim 6, wherein the monomer is present in an amount of between 0.25 and 0.7 parts by weight per part by weight of epoxidised polyester.

9. The composition as claimed in claim 7, wherein the monomer is present in an amount of between 0.25 and 0.7 parts by weight per part by weight of epoxidised polyester.

* * * * *